United States Patent
Shi et al.

(10) Patent No.: US 12,498,422 B2
(45) Date of Patent: Dec. 16, 2025

(54) BATTERY CHARGING METHOD AND DEVICE, AND STORAGE MEDIUM

(71) Applicant: CONTEMPORARY AMPEREX TECHNOLOGY (HONG KONG) LIMITED, Hong Kong (CN)

(72) Inventors: Dongyang Shi, Ningde (CN); Sitong Liu, Ningde (CN); Haizu Jin, Ningde (CN); Baiqing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 872 days.

(21) Appl. No.: 17/705,524

(22) Filed: Mar. 28, 2022

(65) Prior Publication Data

US 2022/0221519 A1    Jul. 14, 2022

Related U.S. Application Data (63) Continuation of application No. PCT/CN2020/118762, filed on Sep. 29, 2020.

(51) Int. Cl.
*G01R 31/36* (2020.01)
*G01R 31/378* (2019.01)
(Continued)

(52) U.S. Cl.
CPC ....... *G01R 31/3648* (2013.01); *G01R 31/378* (2019.01); *G01R 31/392* (2019.01); *H01M 10/44* (2013.01)

(58) Field of Classification Search
CPC .......... H01M 10/44; H01M 2010/4292; G01R 31/392
See application file for complete search history.

(56) References Cited

U.S. PATENT DOCUMENTS

| | | | | |
|---|---|---|---|---|
| 2014/0354233 | A1* | 12/2014 | Yazami | G01R 31/392 324/426 |
| 2015/0241517 | A1 | 8/2015 | Zhuang et al. | |
| 2015/0367744 | A1* | 12/2015 | Saint-Marcoux | B60L 53/00 320/162 |

FOREIGN PATENT DOCUMENTS

| | | |
|---|---|---|
| CN | 1961450 A | 5/2007 |
| CN | 102148410 A | 8/2011 |
| (Continued) | | |

OTHER PUBLICATIONS

Notification to Grant Patent Right for Invention dated Aug. 5, 2024 received in Chinese Patent Application No. 202080102875.6.
(Continued)

*Primary Examiner* — Julian D Huffman
*Assistant Examiner* — Sadia Kousar
(74) *Attorney, Agent, or Firm* — K&L Gates LLP (57) ABSTRACT

Provided are a battery charging method and device, and a storage medium that are applicable to a lithium-ion battery with an N/P range of 0.5 to 1.1. The method includes: obtaining, by a power management system, a state of health (SOH) loss of the lithium-ion battery; and determining a charge cut-off voltage of a next charge process based on the SOH loss, an initial charge cut-off voltage of the lithium-ion battery, and a voltage correction factor, where the initial charge cut-off voltage is determined based on the N/P, and the charge cut-off voltage increases with increase of a count of charging. The N/P range is 0.5 to 1.1, thereby reducing the dosage of the negative electrode and reducing cost. In addition, the charge cut-off voltage of the next charge process is increased based on the SOH loss, thereby ensuring that the lithium-ion battery is free from lithium plating.

21 Claims, 4 Drawing Sheets

(51) Int. Cl.
    *G01R 31/392*    (2019.01)
    *H01M 10/44*    (2006.01)

(56) References Cited

FOREIGN PATENT DOCUMENTS

| CN | 103823189 A | 5/2014 |
| CN | 109941147 A | 6/2019 |
| CN | 110865307 A | 3/2020 |
| CN | 110970670 A | 4/2020 |
| CN | 111008478 A | 4/2020 |

OTHER PUBLICATIONS

First Office Action dated May 18, 2024 received in Chinese Patent Application No. 202080102875.6.

* cited by examiner

BATTERY CHARGING METHOD AND DEVICE, AND STORAGE MEDIUM

CROSS-REFERENCE TO RELATED APPLICATIONS

This application is a continuation of International Application No. PCT/CN2020/118762, filed on Sep. 29, 2020, the disclosure of which is hereby incorporated by reference in its entirety.

TECHNICAL FIELD

The present application relates to the lithium-ion battery technology, and in particular, to a battery charging method and device, and a storage medium.

BACKGROUND

With ongoing development of the lithium-ion battery technology, lithium-ion batteries are more widely used in the fields such as new energy vehicles and communications. In the terminal market, pursuit of a high energy density, a long life, and cost-effectiveness of the lithium-ion batteries is a constant trend. In actual situations, technicians expect to increase a discharge cut-off voltage to allow a battery to release more power and achieve high-energy-density performance of the battery. Conditions of a high discharge cut-off voltage usually bring unexpected side reactions inside the battery and affect the battery life. Therefore, under existing technical conditions, it is usually difficult to achieve a high energy density, an ultra-long life, and cost-effectiveness concurrently.

SUMMARY

The present application provides a battery charging method and device, and a storage medium to ensure a long service life of a lithium-ion battery while reducing an N/P ratio.

To achieve the foregoing objective, a technical solution of the present application is as follows:

1) A battery management system (battery management system, BMS for short) obtains an initial charge cut-off voltage of a lithium-ion battery, where the initial charge cut-off voltage is determined based on a designed N/P value. Under the initial charge cut-off voltage, a negative electrode of the lithium-ion battery achieves a maximum lithiation capability without lithium plating;

2) The BMS monitors a state of health (state of health, SOH for short) of the lithium-ion battery in use, and determines an SOH loss of the lithium-ion battery; and 3) The BMS increases a charge cut-off voltage of a next charge process based on the SOH loss, so that more lithium is deintercalated from a positive electrode in the next charge process to make up for a loss of active lithium (that is, the SOH loss) caused during the cycle. Because the negative electrode material is basically not lost, a maximum lithiation amount of the negative electrode is always maintained, capacity attenuation is prevented, and a long life of the lithium-ion battery is achieved. Specific technical solutions are described below.

According to a first aspect, the present application provides a battery charging method. The method is applicable to a lithium-ion battery with an N/P range of 0.5 to 1.1. The method includes: obtaining, by a power management system, an SOH loss of the lithium-ion battery; and determining, by the power management system, a charge cut-off voltage of a next charge process based on the SOH loss, an initial charge cut-off voltage of the lithium-ion battery, and a voltage correction factor. The initial charge cut-off voltage is determined based on the N/P, and the charge cut-off voltage increases with increase of count of charging.

In a possible implementation, the determining, by the power management system, a charge cut-off voltage of a next charge process based on the SOH loss, an initial charge cut-off voltage of the lithium-ion battery, and a voltage correction factor includes:

determining, by the power management system, the charge cut-off voltage of the next charge process based on the following formula:

$$U = U_0 + \varepsilon \times \Delta SOH$$

where, U represents the charge cut-off voltage of the next charge process, $U_0$ represents the initial charge cut-off voltage, $\Delta SOH$ represents the SOH loss, and $\varepsilon$ represents the voltage correction factor.

In a possible implementation, before the determining, by the power management system, a charge cut-off voltage of a next charge process based on the SOH loss, an initial charge cut-off voltage of the lithium-ion battery, and a voltage correction factor, the battery charging method may further include at least one of:

obtaining, by the power management system, the initial charge cut-off voltage, where the initial charge cut-off voltage is determined based on a maximum charge capacity per unit mass of a positive electrode material of the lithium-ion battery, a differential voltage vs. capacity curve of the positive electrode material, a safety redundancy factor, a lower-limit cut-off voltage applied to the lithium-ion battery, and the N/P; or obtaining, by the power management system, the voltage correction factor, where the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

In a possible implementation, the initial charge cut-off voltage is determined based on the following formula:

$$U_0 = \int_0^{\frac{C_0 \times (N/P)}{a}} \frac{dU}{dQ} \times dQ + U_{low}$$

where, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

In a possible implementation, the voltage correction factor is determined based on the following formula:

$$\varepsilon = b \times \frac{dU}{C_0 \times dQ} \times ICE$$

where, ε represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

According to a second aspect, the present application provides a battery charging device. The device is applicable to a lithium-ion battery with an N/P range of 0.5 to 1.1. The battery charging device includes:

an obtaining module, configured to obtain an SOH loss of the lithium-ion battery; and a processing module, configured to determine a charge cut-off voltage of a next charge process based on the SOH loss, an initial charge cut-off voltage of the lithium-ion battery, and a voltage correction factor, where the initial charge cut-off voltage is determined based on the N/P, and the charge cut-off voltage increases with increase of count of charging.

In a possible implementation, the processing module is specifically configured to:

determine the charge cut-off voltage of the next charge process based on the following formula:

$$U = U_0 + \varepsilon \times \Delta SOH$$

where, U represents the charge cut-off voltage of the next charge process, $U_0$ represents the initial charge cut-off voltage, ΔSOH represents the SOH loss, and ε represents the voltage correction factor.

In a possible implementation, the processing module is further configured to:

obtain the initial charge cut-off voltage before determining the charge cut-off voltage of the next charge process based on the SOH loss, the initial charge cut-off voltage of the lithium-ion battery, and the voltage correction factor, where the initial charge cut-off voltage is determined based on a maximum charge capacity per unit mass of a positive electrode material of the lithium-ion battery, a differential voltage vs. capacity curve of the positive electrode material, a safety redundancy factor, a lower-limit cut-off voltage applied to the lithium-ion battery, and the N/P; and/or obtain the voltage correction factor before determining the charge cut-off voltage of the next charge process based on the SOH loss, the initial charge cut-off voltage of the lithium-ion battery, and the voltage correction factor, where the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

In a possible implementation, the initial charge cut-off voltage is determined based on the following formula:

$$U_0 = \int_0^{\frac{C_0 \times (N/P)}{a}} \frac{dU}{dQ} \times dQ + U_{low}$$

where, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

In a possible implementation, the voltage correction factor is determined based on the following formula:

$$\varepsilon = b \times \frac{dU}{C_0 \times dQ} \times ICE$$

where, ε represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

On the basis of any of the foregoing possible implementations:

Optionally, the N/P range is 0.8 to 1.0.

Optionally, the safety redundancy factor is greater than or equal to 1, and the safety redundancy factor is less than or equal to 1.3.

Optionally, the safety redundancy factor is greater than or equal to 1.03, and the safety redundancy factor is less than or equal to 1.08.

Optionally, the voltage compensation factor is greater than 0, and the voltage compensation factor is less than or equal to 1.

According to a third aspect, the present application provides a power management system. The power management system is configured to perform any of the methods described in the first aspect.

According to a fourth aspect, the present application provides an electronic device, including: a memory and a processor.

The memory is configured to store a program instruction.

The processor is configured to invoke the program instruction in the memory to perform any of the methods described in the first aspect.

According to a fifth aspect, the present application provides a readable storage medium. The readable storage medium stores a computer program. When being executed, the computer program implements any of the methods described in the first aspect.

Other features and advantages of the present prevention will be partly described in detail in the subsequent specific embodiments.

BRIEF DESCRIPTION OF DRAWINGS

To describe the technical solutions in the embodiments of the present application or the prior art more clearly, the following outlines the drawings to be used in the description of the embodiments of the present application or the prior art. Evidently, the drawings outlined below are merely some embodiments of the present application, and a person of ordinary skill in the art may derive other drawings from the drawings without making any creative efforts.

DETAILED DESCRIPTION OF EMBODIMENTS

The following clearly describes the technical solutions in the embodiments of the present application in full with reference to the accompanying drawings in the embodiments of the present application. Apparently, the described embodiments are merely some of but not all of the embodiments of the present application. All other embodiments derived by a person of ordinary skill in the art based on the embodiments of the present application without making any creative efforts fall within the protection scope of the present application.

In actual situations, technicians expect to increase a charge cut-off voltage to allow a battery to release more power and achieve high-energy-density performance of the battery. Conditions of a high charge cut-off voltage usually bring unexpected side reactions inside the battery and affect the battery life. Therefore, under existing technical conditions, it is usually difficult to achieve both a high energy density and a long life.

In addition, to ensure that a negative electrode of a battery in the market is free from lithium plating, a capacity of the negative electrode in the battery design is usually excessive, that is, an N/P ratio is greater than 1 (N/P is a ratio of a capacity per unit area of the negative electrode to a capacity per unit area of a positive electrode), and the N/P ratio is generally 1.03 to 1.15.

Research shows that under normal working conditions, the lithium-ion battery generally fails in an ultimate mode of capacity loss, where the capacity loss is caused by a series of side reactions occurring in active lithium and by a change in a local crystal structure of a positive electrode material. However, electrochemical activity of graphite serving as a negative active material basically remains unchanged. That is, the negative electrode always maintains a high capability of lithium intercalation and deintercalation. At a late stage of a cycle of the battery, a lithium storage capacity of the negative electrode is usually surplus and cannot be used effectively. Therefore, to increase an energy density of the lithium-ion battery, a weight of coating on the negative electrode is reduced, that is, the N/P ratio is reduced. N/P is a ratio of the capacity per unit area of the negative electrode to the capacity per unit area of the positive electrode. The high capability of lithium intercalation and deintercalation of the negative electrode is efficiently used by reducing the weight of coating on the negative electrode. However, a lower N/P ratio makes it more likely to precipitate lithium, thereby deteriorating the service life of the lithium-ion battery.

Therefore, how to ensure a high service life of the lithium-ion battery while reducing the N/P ratio is an urgent issue to be solved currently.

In view of the foregoing problem, the present application provides a battery charging method and device, and a storage medium. By optimizing battery design, the weight of coating on the negative electrode of the lithium-ion battery is reduced, and the N/P ratio is reduced. In addition, a BMS usage policy is used together to maximally utilize the basically non-attenuating capability of lithium intercalation and deintercalation of the negative electrode, and achieve a long life, a high energy density, and cost-effectiveness of the lithium-ion battery concurrently.

Figure 1:
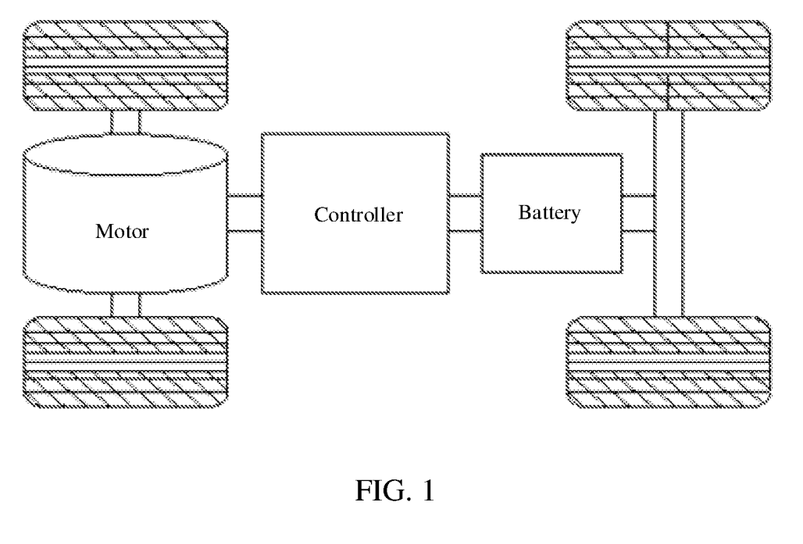
FIG. 1 shows an exemplary application scenario according to the present application.

FIG. 1 shows an exemplary application scenario according to the present application. Referring to FIG. 1, an electric vehicle includes, but without limitation, a motor, a controller, and a battery. The battery is a lithium-ion battery, and provides electric energy for a driving motor of the electric vehicle. The controller is a core control device configured to control the start, run, forward and backward movements, speed, and stop of the electric vehicle and to control other electronic devices of the electric vehicle. The motor converts electrical energy of the battery into mechanical energy, and drives wheels and working devices directly or through a transmission device. During the use of an electric vehicle, the electric vehicle needs to be charged to ensure normal operation. A condition of ending each charge process is that a voltage between the positive electrode and the negative electrode of the lithium-ion battery reaches a charge cut-off voltage.

In existing technologies, the charge cut-off voltage is set at delivery of the lithium-ion battery from the manufacturer. Considering SOH attenuation of the lithium-ion battery, the charge cut-off voltage is generally set to a relatively high value at delivery from the manufacturer. In the present application, the N/P ratio of the lithium-ion battery is reduced, and the charge cut-off voltage is adjusted constantly during use, the charge cut-off voltage that is set at delivery of the lithium-ion battery from the manufacturer (that is, the initial charge cut-off voltage to be mentioned later) can be lower than the charge cut-off voltage of an equivalent lithium-ion battery based on existing technologies.

The battery charging method according to the present application will be expounded below with reference to specific embodiments.

Figure 2:
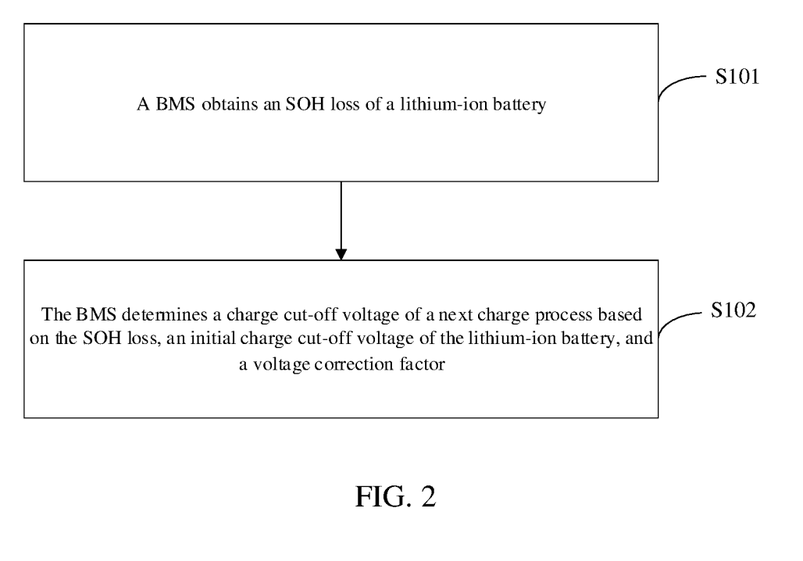
FIG. 2 is a flowchart of a battery charging method according to an embodiment of the present application.

FIG. 2 is a flowchart of a battery charging method according to an embodiment of the present application. An embodiment of the present application provides a battery charging method. The method is applicable to a lithium-ion battery with an N/P range of 0.5 to 1.1. As shown in FIG. 2, the battery charging method includes the following steps:

S101. A BMS obtains an SOH loss of a lithium-ion battery; and

S102. The BMS determines a charge cut-off voltage of a next charge process based on the SOH loss, an initial charge cut-off voltage of the lithium-ion battery, and a voltage correction factor.

The initial charge cut-off voltage is determined based on the N/P, and the charge cut-off voltage increases with increase of count of charging.

In existing technologies, to ensure that a negative electrode of the lithium-ion battery is free from lithium plating, an N/P ratio of the lithium-ion battery is generally designed to be greater than 1, and a N/P range is generally 1.03 to 1.15. To increase an energy density of the lithium-ion battery in the present application, the design of the lithium-ion battery is optimized and a weight of coating on the negative electrode is reduced in the present application, so that the N/P ratio is as low as 0.5 to 1.1. On the basis of the foregoing special N/P design, by adjusting a BMS charging policy, the present application always maximally utilizes a lithium storage space of the negative electrode and a non-attenuating capability of lithium intercalation and deintercalation throughout a lifespan, thereby achieving both a high energy density and a long life.

Specifically, during the use of the lithium-ion battery, the lithium-ion battery is gradually aging and performance is deteriorating. The BMS monitors the SOH of the lithium-ion battery to obtain the SOH loss of the lithium-ion battery. For example, the BMS records charge and discharge capacities of the battery in a fixed SOC interval at regular intervals. For example, a discharge capacity of the battery in a SOC range of 20% to 80% in an initial state is C1. After a period of use, the discharge capacity in the same SOC range of 20% to 80% is C2. Therefore, the SOH loss in this period is: $\Delta SOH=(C1-C2)/C1\times100\%$. Alternatively, the SOH loss may be obtained in other ways. For example, the SOH loss is collected by a sensor automatically; or, the SOH loss is manually set based on user interactions. This is not limited herein.

The BMS determines a charge cut-off voltage of a next charge process based on the SOH loss, an initial charge cut-off voltage of the lithium-ion battery, and a voltage correction factor. Performance degradation of the lithium-ion battery in use is mainly due to the loss of the positive electrode material and the active lithium. Therefore, the BMS increases a charge cut-off voltage of a next charge process based on the SOH loss, so that more lithium is deintercalated from a positive electrode in the next charge process to make up for a loss of active lithium (that is, the SOH loss) caused during the cycle. Because the negative electrode material is basically not lost, a maximum lithiation amount of the negative electrode is always maintained, capacity attenuation is prevented, and a long life of the lithium-ion battery is achieved.

The battery charging method according to this embodiment of the present application is applicable to a lithium-ion battery with an N/P range of 0.5 to 1.1. The method includes: obtaining, by a power management system, a state of health (SOH) loss of the lithium-ion battery; and determining a charge cut-off voltage of a next charge process based on the SOH loss, an initial charge cut-off voltage of the lithium-ion battery, and a voltage correction factor, where the initial charge cut-off voltage is determined based on the N/P, and the charge cut-off voltage increases with increase of a count of charging. On the one hand, the N/P range is 0.5 to 1.1 reducing the dosage of the negative electrode, thereby reducing cost, and increasing the energy density. On the other hand, the charge cut-off voltage of the next charge process is increased based on the SOH loss, thereby ensuring that the lithium-ion battery is free from lithium plating. Therefore, a long service life of the lithium-ion battery is ensured while the N/P is lowered.

On the basis of the preceding embodiment, in a possible implementation, step S102 "The BMS determines a charge cut-off voltage of a next charge process based on the SOH loss, an initial charge cut-off voltage of the lithium-ion battery, and a voltage correction factor" may specifically be:

determining, by the power management system, the charge cut-off voltage of the next charge process based on the following formula:

$$U=U_0+\varepsilon\times\Delta SOH$$

where, U represents the charge cut-off voltage of the next charge process, $U_0$ represents the initial charge cut-off voltage, $\Delta SOH$ represents the SOH loss, and $\varepsilon$ represents the voltage correction factor.

Understandably, the foregoing formula may be modified appropriately, for example, by adding or deleting a constant to allow for data compensation based on actual conditions. Such modifications also fall within the protection scope of the present application.

In step S102, before the BMS determines a charge cut-off voltage of a next charge process based on the SOH loss, an initial charge cut-off voltage of the lithium-ion battery, and a voltage correction factor, the BMS needs to determine the initial charge cut-off voltage of the lithium-ion battery and the voltage correction factor. Therefore, the battery charging method further includes at least one of:

obtaining, by the power management system, the initial charge cut-off voltage, where the initial charge cut-off voltage is determined based on a maximum charge capacity per unit mass of a positive electrode material of the lithium-ion battery, a differential voltage vs. capacity curve of the positive electrode material, a safety redundancy factor, a lower-limit cut-off voltage applied to the lithium-ion battery, and the N/P; or obtaining, by the power management system, the voltage correction factor, where the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

In some embodiments, the initial charge cut-off voltage is determined based on the following formula:

$$U_0 = \int_0^{\frac{C_0\times(N/P)}{a}} \frac{dU}{dQ}\times dQ + U_{low}$$

where, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

The initial charge cut-off voltage depends on a material system and the N/P ratio of the lithium-ion battery. For each determined material system, the initial charge cut-off voltage may be calculated from the foregoing formula. After being determined, the initial charge cut-off voltage of the lithium-ion battery is input to the BMS. At the initial charge cut-off voltage, the negative electrode of the lithium-ion battery achieves a maximum lithiation capability without lithium plating.

Optionally, the safety redundancy factor is greater than or equal to 1, and the safety redundancy factor is less than or equal to 1.3. Further, the safety redundancy factor is greater than or equal to 1.03, and the safety redundancy factor is less than or equal to 1.08.

Figure 3:
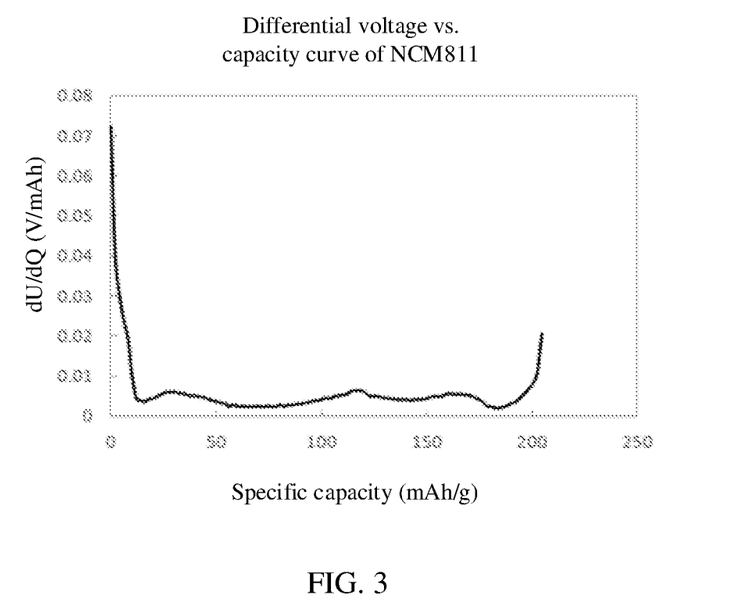
FIG. 3 is a differential voltage vs. capacity curve according to an embodiment of the present application.

For example, FIG. 3 is a differential voltage vs. capacity curve of an NCM811 positive electrode material, where a physical meaning of a vertical coordinate dU/dQ is a voltage increment caused by the change per unit capacity. For the NCM811 positive electrode material, $U_{low}$ is generally 2.8 V. The maximum charge capacity $C_0$ per unit mass is 201 mAh/g. When N/P is 1 and a is 1.05, the amount of lithium that needs to be deintercalated from the positive electrode material is $C_0 \times (N/P)/a = 201 \times 1/1.05 = 191.4$ mAh/g. Then, based on the curve in FIG. 3, an integral of the capacity from 0 to 191.4 mAh/g in a horizontal coordinate is calculated to obtain the voltage increment that is caused when the amount of lithium of 191.4 mAh/g is deintercalated from the positive electrode. A sum of a lower-limit cut-off voltage $U_{low}$ and the voltage increment is the initial charge cut-off voltage.

Figure 4:
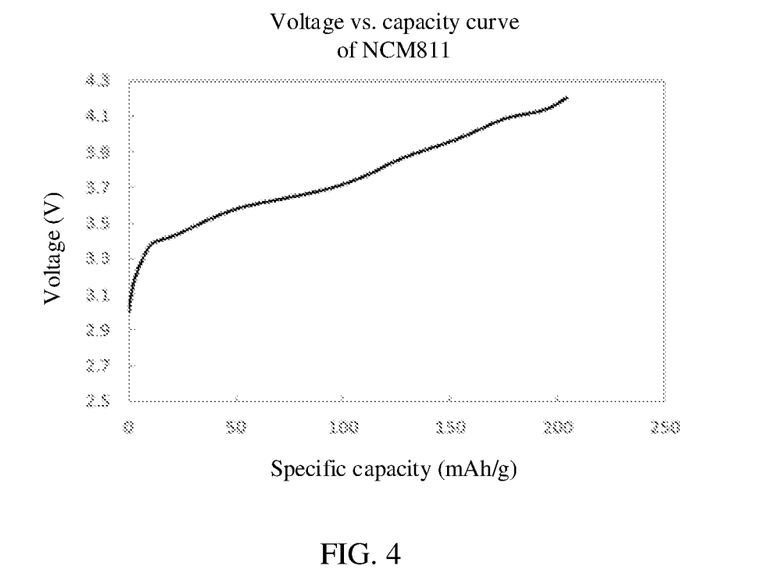
FIG. 4 is a voltage vs. capacity curve according to an embodiment of the present application.

In addition, the initial charge cut-off voltage may also be obtained from a voltage vs. capacity curve of the positive electrode material. FIG. 4 shows a voltage vs. capacity curve of the NCM811 positive electrode material. When the N/P ratio is 1 and a is 1.05, the delithiation capacity of the positive electrode is 191.4 mAh/g. The voltage corresponding to the delithiation capacity of 191.4 mAh/g of the positive electrode may be obtained directly from the voltage vs. capacity curve, and is the initial charge cut-off voltage.

The initial charge cut-off voltages in different material systems and under different N/P ratios are calculated beforehand in a non-live manner and input to the BMS directly.

In addition, the voltage correction factor is determined based on the following formula:

$$\varepsilon = b \times \frac{dU}{C_0 \times dQ} \times ICE$$

where, $\varepsilon$ represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

Optionally, the voltage compensation factor is greater than 0, and the voltage compensation factor is less than or equal to 1. When the voltage compensation factor is equal to 1, the maximum lithiation capacity is always maintained on the negative electrode. When the voltage compensation factor is less than 1, the negative electrode can leave a larger margin, thereby helping to increase the service life of the lithium-ion battery.

Specifically, for a definite material system, b, $C_0$, and ICE are constants, $\varepsilon$ just depends on the change of $$\frac{dU}{dQ}$$

of the positive electrode material of the lithium-ion battery.

$$\frac{dU}{dQ}$$

is a voltage increment caused by a unit capacity variation, and therefore, $$\frac{dU}{C_0 \times dQ}$$

represents a voltage increment caused by a unit SOH variation. A unit SOH loss may be approximately equivalent to a capacity loss caused by a unit SOH variation. Therefore, the voltage correction factor $\varepsilon$ is in positive correlation with $$\frac{dU}{C_0 \times dQ}.$$

Figure 5:
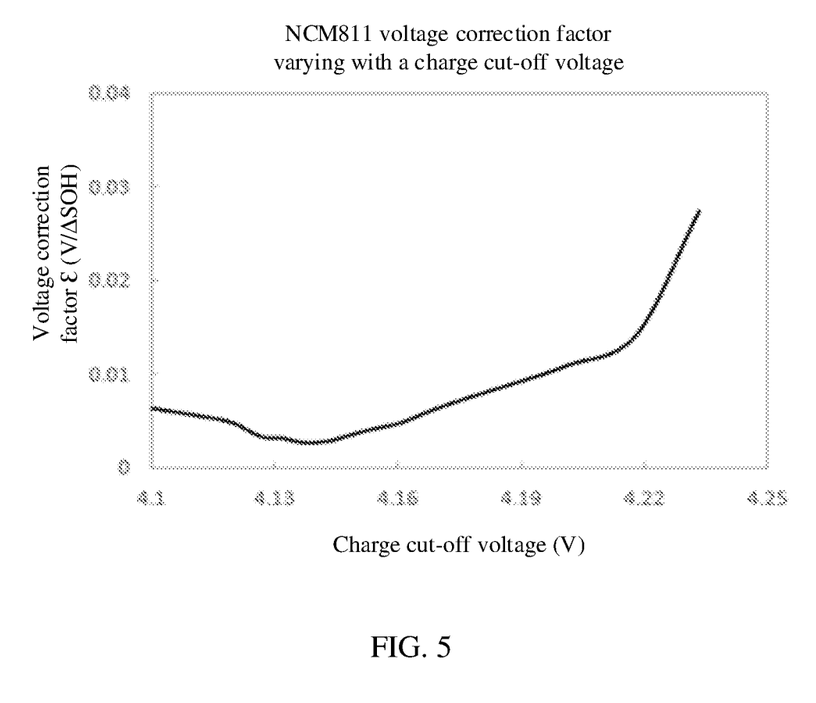
FIG. 5 is a schematic relational diagram of a voltage correction factor varying with a charge cut-off voltage according to an embodiment of the present application.

FIG. 5 is a variation curve that shows an NCM811 voltage correction factor E varying with a charge cut-off voltage. Based on this relational expression, the BMS can obtain the SOH loss to calculate a next charge cut-off voltage. If the charge cut-off voltage is higher, the charge cut-off voltage will increase by a larger increment whenever the SOH declines by 1%.

As can be seen from the foregoing formula, the initial charge cut-off voltage is proportional to the N/P ratio. The lower the N/P ratio, the lower the corresponding initial charge cut-off voltage. In addition, both the initial charge cut-off voltage and the voltage correction factor are also related to the material system of the lithium-ion battery. For example, for a currently typical positive electrode material (ternary NCM/NCA, lithium iron phosphate, lithium manganate, and the like)/graphite system, the initial charge cut-off voltage $U_0$ can be controlled to fall within 3.4 V to 4.5 V. Whenever the SOH declines by 1%, the charge cut-off voltage can be increased correspondingly (the voltage correction factor E is any value falling within 1 mV to 30 mV). Overall, through ingenious coordination of the N/P design and the BMS charging policy, on the basis of ensuring that the negative electrode is free from lithium plating, the non-attenuating capability of lithium intercalation and deintercalation of the negative electrode is maximally utilized to achieve cost-effectiveness, an ultra-long life, and a high energy density, but without attenuating the battery capacity at all, and experience of end users is enhanced.

Table 1 shows charge parameters (including initial charge cut-off voltage, voltage correction factor, and charge cut-off voltage) corresponding to different material systems and different N/P ratios.

TABLE 1

Charge parameters corresponding to different material systems and different N/P ratios

| | Material system | N/P | Initial charge voltage range (V) | Voltage correction factor ε(mV/ΔSOH) | Charging upper-limit protection voltage (V) |
|---|---|---|---|---|---|
| Embodiment 1 | NCM811/graphite | 1 | 2.8 V to 4.15 V | 4 mV to 28 mV | 4.25 |
| Embodiment 2 | NCM811/graphite | 0.9 | 2.8 V to 4.09 V | 3 mV to 28 mV | 4.25 |
| Embodiment 3 | NCM622/graphite | 1 | 2.8 V to 4.3 V | 4 mV to 28 mV | 4.4 |
| Embodiment 4 | NCM622/graphite | 0.9 | 2.8 V to 4.18 V | 3 mV to 28 mV | 4.4 |
| Embodiment 5 | NCM523/graphite | 1 | 2.8 V to 4.26 V | 6 mV to 25 mV | 4.35 |
| Embodiment 6 | NCM523/graphite | 0.9 | 2.8 V to 4.18 V | 4 mV to 25 mV | 4.35 |
| Embodiment 7 | NCM333/graphite | 1 | 2.8 V to 4.27 V | 4 mV to 22 mV | 4.35 |
| Embodiment 8 | NCM333/graphite | 0.9 | 2.8 V to 4.12 V | 3 mV to 22 mV | 4.35 |
| Embodiment 9 | Lithium iron phosphate/graphite | 1 | 2.5 V to 3.57 V | 2 mV to 18 mV | 3.65 |
| Embodiment 10 | Lithium iron phosphate/graphite | 0.9 | 2.5 V to 3.51 V | 1 mV to 18 mV | 3.65 |
| Embodiment 11 | Lithium manganate/graphite | 1 | 2.8 V to 4.32 V | 4 mV to 23 mV | 4.4 |
| Embodiment 12 | Lithium manganate/graphite | 0.9 | 2.8 V to 4.23 V | 2 mV to 23 mV | 4.4 |

FIG. 2 Test results of a battery charging method according to embodiments and comparative embodiments of the present application

| | Material system | N/P | Designed capacity of the battery (Ah) | Capacity retention rate after 5000 cycles performed at 25° C. and 0.5 C./1 C. | Energy throughput (KWh) |
|---|---|---|---|---|---|
| Embodiment 1 | NCM811/graphite | 1 | 85 | 99.8% | 1551 |
| Embodiment 2 | NCM811/graphite | 0.9 | 85 | 99.8% | 1532 |
| Embodiment 3 | NCM622/graphite | 1 | 85 | 99.8% | 1585 |
| Embodiment 4 | NCM622/graphite | 0.9 | 85 | 99.8% | 1553 |
| Embodiment 5 | NCM523/graphite | 1 | 85 | 99.9% | 1575 |
| Embodiment 6 | NCM523/graphite | 0.9 | 85 | 99.9% | 1542 |
| Embodiment 7 | NCM333/graphite | 1 | 85 | 99.9% | 1543 |
| Embodiment 8 | NCM333/graphite | 0.9 | 85 | 99.9% | 1528 |
| Embodiment 9 | Lithium iron | 1 | 85 | 99.9% | 1360 |
| Embodiment 10 | Lithium iron | 0.9 | 85 | 99.9% | 1329 |
| Embodiment 11 | Lithium | 1 | 85 | 99.8% | 1588 |
| Embodiment 12 | Lithium | 0.9 | 85 | 99.8% | 1546 |
| Comparative | NCM811/graphite | 1.1 | 85 | 49.3% | 1026 |
| Comparative | NCM622/graphite | 1.1 | 85 | 48.6% | 1025 |
| Comparative | NCM523/graphite | 1.1 | 85 | 49.6% | 1038 |
| Comparative | NCM333/graphite | 1.1 | 85 | 55.6% | 1082 |
| Comparative | Lithium iron | 1.1 | 85 | 70.6% | 1062 |
| Comparative | Lithium | 1.1 | 85 | 51.5% | 1053 |

Embodiment 1

Preparing a Positive Electrode Plate

Mixing a nickel cobalt manganese (NCM811) ternary material as a positive active material, acetylene black as a conductive agent, and polyvinylidene difluoride (PVDF) as a binder evenly at a mass ratio of 97:2:1, adding the mixture into an NMP solvent to make a positive slurry. Coating an aluminum foil as a positive current collector with the positive slurry evenly, drying the aluminum foil at 85° C. and cold-calendering it, and then performing die-cutting and slitting to make a positive electrode plate of the lithium-ion battery.

Preparing a Negative Electrode Plate

Adding graphite as a negative active material, acetylene black as a conductive agent, sodium carboxymethyl cellulose (CMC) as a thickener, and styrene butadiene rubber (SBR) as a binder into a water solvent at a mass ratio of 96:2:1:1, and mixing evenly to make a negative slurry. Coating a copper foil as a negative current collector with the negative slurry evenly, drying the copper foil at 85° C., and cold-calendering it to make a negative electrode plate of the lithium-ion battery.

Preparing a Separator

Using a polyethylene microporous film as a porous separator substrate, mixing inorganic alumina powder, polyvinylpyrrolidone, and an acetone solvent evenly at a mass ratio of 3:1.5:5.5 to form a slurry, coating one side of the substrate with the slurry, and drying the substrate to obtain a separator.

Preparing an Electrolytic Solution

Dissolving lithium hexafluorophosphate in a mixed solvent of ethylene carbonate, dimethyl carbonate, and ethyl methyl carbonate (a volume ratio of ethylene carbonate to dimethyl carbonate to ethyl methyl carbonate is 1:2:1) to obtain an electrolytic solution of the lithium-ion battery.

Preparing a Lithium-Ion Battery

Winding the positive electrode plate, the negative electrode plate, and the separator to obtain a bare cell, and then performing steps such as sealing, electrolyte injection, chemical formation, and degassing to make the lithium-ion battery described in Embodiment 1. The N/P ratio of the battery is 1, and the designed rated capacity of the battery is 85 Ah.

Embodiment 2

The lithium-ion battery according to Embodiment 2 of the present application is basically the same as the lithium-ion battery according to Embodiment 1 of the present application except that the weight of coating on the negative electrode is reduced although the weight of coating on the positive electrode remains unchanged, so that the N/P ratio of the battery is 0.9.

Embodiment 3

The lithium-ion battery according to Embodiment 3 of the present application is basically the same as the lithium-ion battery according to Embodiment 1 of the present application except that the material of the positive electrode is NCM622.

Embodiment 4

The lithium-ion battery according to Embodiment 4 of the present application is basically the same as the lithium-ion battery according to Embodiment 1 of the present application except that the material of the positive electrode is NCM622 and the N/P ratio of the battery is 0.9.

Embodiment 5

The lithium-ion battery according to Embodiment 5 of the present application is basically the same as the lithium-ion battery according to Embodiment 1 of the present application except that the material of the positive electrode is NCM523.

Embodiment 6

The lithium-ion battery according to Embodiment 6 of the present application is basically the same as the lithium-ion battery according to Embodiment 1 of the present application except that the material of the positive electrode is NCM523 and the N/P ratio of the battery is 0.9.

Embodiment 7

The lithium-ion battery according to Embodiment 7 of the present application is basically the same as the lithium-ion battery according to Embodiment 1 of the present application except that the material of the positive electrode is NCM333.

Embodiment 8

The lithium-ion battery according to Embodiment 8 of the present application is basically the same as the lithium-ion battery according to Embodiment 1 of the present application except that the material of the positive electrode is NCM333 and the N/P ratio of the battery is 0.9.

Embodiment 9

The lithium-ion battery according to Embodiment 9 of the present application is basically the same as the lithium-ion battery according to Embodiment 1 of the present application except that the material of the positive electrode is lithium iron phosphate.

Embodiment 10

The lithium-ion battery according to Embodiment 10 of the present application is basically the same as the lithium-ion battery according to Embodiment 1 of the present application except that the material of the positive electrode is lithium iron phosphate and the N/P ratio of the battery is 0.9.

Embodiment 11

The lithium-ion battery according to Embodiment 11 of the present application is basically the same as the lithium-ion battery according to Embodiment 1 of the present application except that the material of the positive electrode is lithium manganate.

Embodiment 12

The lithium-ion battery according to Embodiment 12 of the present application is basically the same as the lithium-ion battery according to Embodiment 1 of the present application except that the material of the positive electrode is lithium manganate and the N/P ratio of the battery is 0.9.

Comparative Embodiment 1

The lithium-ion battery according to Comparative Embodiment 1 of the present application is basically the same as the lithium-ion battery according to Embodiment 1 of the present application except that the weight of coating on the negative electrode is increased although the weight of coating on the positive electrode remains unchanged, so that the N/P ratio of the battery is 1.1.

Comparative Embodiment 2

The lithium-ion battery according to Comparative Embodiment 2 of the present application is basically the same as the lithium-ion battery according to Embodiment 1 of the present application except that the positive electrode material is NCM622, the weight of coating on the negative electrode is increased although the weight of coating on the positive electrode remains unchanged, so that the N/P ratio of the battery is 1.1.

Comparative Embodiment 3

The lithium-ion battery according to Comparative Embodiment 3 of the present application is basically the same as the lithium-ion battery according to Embodiment 1 of the present application except that the positive electrode material is NCM523, the weight of coating on the negative electrode is increased although the weight of coating on the positive electrode remains unchanged, so that the N/P ratio of the battery is 1.1.

Comparative Embodiment 4

The lithium-ion battery according to Comparative Embodiment 1 of the present application is basically the same as the lithium-ion battery according to Embodiment 1 of the present application except that the positive electrode material is NCM333, the weight of coating on the negative electrode is increased although the weight of coating on the positive electrode remains unchanged, so that the N/P ratio of the battery is 1.1.

Comparative Embodiment 5

The lithium-ion battery according to Comparative Embodiment 2 of the present application is basically the same as the lithium-ion battery according to Embodiment 1 of the present application except that the positive electrode material is lithium iron phosphate, the weight of coating on the negative electrode is increased although the weight of coating on the positive electrode remains unchanged, so that the N/P ratio of the battery is 1.1.

Comparative Embodiment 6

The lithium-ion battery according to Comparative Embodiment 3 of the present application is basically the same as the lithium-ion battery according to Embodiment 1 of the present application except that the positive electrode material is lithium manganate, the weight of coating on the negative electrode is increased although the weight of coating on the positive electrode remains unchanged, so that the N/P ratio of the battery is 1.1.

Performance Test

Testing a capacity retention rate and an energy throughput: In order to identify the impact of the solution of the present application on the service life of the lithium-ion battery, a cycle test is performed on the lithium-ion battery of the foregoing embodiment and the lithium-ion battery of the comparative embodiment. The cycle test is performed at a temperature of 25° C. and a current rate of 0.5 C/1 C by using the battery charging method of the present application and a conventional battery charging method respectively to evaluate the capacity retention rate and the energy throughput of the battery. The cycle capacity retention rate is a ratio of a discharge capacity after cycling for a specific number of times to a discharge capacity of discharging at a current rate of 1 C for a $2^{nd}$ time. The energy throughput is total energy emitted during a lifespan of 5000 cycles.

In Embodiment 1, the battery charging method of the present application is applied. First, because the N/P ratio of the lithium-ion battery is 1, it is determined that the initial charge cut-off voltage of the lithium-ion battery is 4.15 V. As the SOH of the lithium-ion battery declines (that is, as the SOH loss occurs), the charge cut-off voltage is increased gradually. As can be seen from the test results (Table 2), after the battery is charged for 5000 cycles by using the battery charging method of the present application, the capacity retention rate remains at approximately 99.8%, and the capacity basically does not attenuate.

As can be seen from the test results of Embodiment 2, for a design with a lower N/P ratio, the battery charging method is also applicable. When the N/P is 0.9, the dosage of the negative electrode of the lithium-ion battery is reduced. To ensure that the negative electrode is free from lithium plating, the initial charge cut-off voltage is reduced to 4.09 V. Subsequently, as the SOH loss occurs in the lithium-ion battery, the charge cut-off voltage is increased gradually. After 5000 cycles, the capacity retention rate also remains at approximately 99.8%.

By contrast, in Comparative Embodiment 1, the material system is exactly the same as that in Embodiment 1 and Embodiment 2, but differences are: the N/P ratio of the battery is a conventional value, that is, N/P=1.1, the initial charge cut-off voltage is 4.25 V, and a charge voltage interval is always maintained at 2.8 V to 4.25 V during the cycle test. Evidently, after the battery has been tested for 5000 cycles, the capacity of the battery has attenuated significantly, and is just able to stay around 50%. From the perspective of energy throughput, the energy throughput achieved in Embodiment 1 as tested by using the charging method of the present application is up to 1551 kWh and 1532 kWh, which is much higher than 1026 kWh achieved in Comparative Embodiment 1.

In addition, as indicated in the test results of Embodiments 3 to 12 and Comparative Embodiments 2 to 6 (Table 2), this method is not only applicable to an NCM811 ternary system, but also applicable to different chemical systems (NCM622, NCM523, NCM333, lithium iron phosphate, lithium manganate, and the like). Therefore, the battery charging method provided in the present application is much universally applicable.

As can be seen from the detailed description of various embodiments of the present application above, compared with existing conventional technologies, the lithium-ion battery designed in the present application possesses the following advantages:

Compared with the conventional lithium-ion batteries, the present application possesses at least the following advantages:

1. The N/P ratio is lowered, and the total dosage of the negative electrode is reduced. Instead, the basically non-attenuating capability of lithium intercalation and deintercalation of the negative electrode is maximally reused to achieve cost-effectiveness;
2. Based on the SOH loss, the charge cut-off voltage of the next charge process is adjusted in real time, and the lithiation capability of the negative electrode is always utilized maximally to improve the lifespan of the lithium-ion battery;
3. The initial charge cut-off voltage used by lithium-ion battery in an initial stage is relatively low, and the charge cut-off voltage is gradually increased with the decline of the SOH of the lithium-ion battery in a later stage. By contrast, the conventional lithium-ion battery keeps working at a high voltage all along. Therefore, the present application reduces the use time of the lithium-ion battery working at a high potential, thereby reducing many side reactions, reducing the consumption of active lithium, electrolyte additives, and the electrolytic solution, and prolonging the service life of lithium-ion battery;
4. The total dosage of the negative electrode is reduced, and a designed filling ratio of the battery is reduced, thereby reducing an expansion force of the lithium-ion battery in use, reducing the risks of plunging of the cycle capacity of a battery cell caused by an excessive expansion force, and achieving an ultra-long service life; and
5. The total dosage of the negative electrode is reduced to ensure that more space is saved to further increase the energy density without affecting a cruising range during the lifespan.

The following describes a device embodiment of the present application. The device can be used to implement the foregoing method embodiments of the present application. Details not given in the device embodiment of the present application may be obtained with reference to the method embodiments of the present application.

Figure 6:
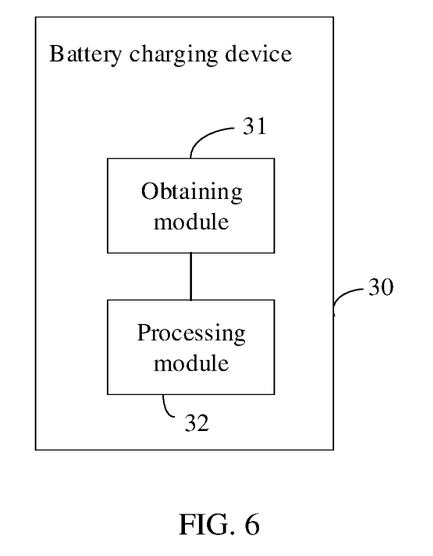
FIG. 6 is a schematic structural diagram of a battery charging device according to an embodiment of the present application.

FIG. 6 is a schematic structural diagram of a battery charging device according to an embodiment of the present application. The battery charging device may be implemented by software and/or hardware. In practical applications, the battery charging device may be an electronic device equipped with a BMS and powered by a lithium-ion battery, for example, a vehicle, a computer, a mobile phone, or a tablet. The N/P ratio of the lithium-ion battery falls within a range of 0.5 to 1.1; or, the battery charging device may be a chip or a circuit in the electronic device.

As shown in FIG. 6, the battery charging device 30 according to this embodiment includes:

an obtaining module 31, configured to obtain an SOH loss of the lithium-ion battery; and a processing module 32, configured to determine a charge cut-off voltage of a next charge process based on the SOH loss, an initial charge cut-off voltage of the lithium-ion battery, and a voltage correction factor. The initial charge cut-off voltage is determined based on the N/P, and the charge cut-off voltage increases with increase of a count of charging.

The battery charging device provided in this embodiment of the present application can implement the technical solutions shown in the foregoing method embodiments. The implementation principles and beneficial effects of the battery charging device are similar to those of the method embodiment, details of which are omitted here.

On the basis of the foregoing, optionally, the N/P range is 0.8 to 1.0.

In some embodiments, the processing module 32 may be specifically configured to:

determine the charge cut-off voltage of the next charge process based on the following formula:

$$U = U_0 + \varepsilon \times \Delta SOH$$

where, U represents the charge cut-off voltage of the next charge process, $U_0$ represents the initial charge cut-off voltage, $\Delta SOH$ represents the SOH loss, and $\varepsilon$ represents the voltage correction factor.

Further, the processing module 32 may be further configured to:

obtain the initial charge cut-off voltage before determining the charge cut-off voltage of the next charge process based on the SOH loss, the initial charge cut-off voltage of the lithium-ion battery, and the voltage correction factor, where the initial charge cut-off voltage is determined based on a maximum charge capacity per unit mass of a positive electrode material of the lithium-ion battery, a differential voltage vs. capacity curve of the positive electrode material, a safety redundancy factor, a lower-limit cut-off voltage applied to the lithium-ion battery, and the N/P; and/or obtain the voltage correction factor before determining the charge cut-off voltage of the next charge process based on the SOH loss, the initial charge cut-off voltage of the lithium-ion battery, and the voltage correction factor, where the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

In an implementation, the initial charge cut-off voltage is determined based on the following formula:

$$U_0 = \int_0^{\frac{C_0 \times (N/P)}{a}} \frac{dU}{dQ} \times dQ + U_{low}$$

where, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

In another implementation, the voltage correction factor is determined based on the following formula:

$$\varepsilon = b \times \frac{dU}{C_0 \times dQ} \times ICE$$

where, $\varepsilon$ represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

On the basis of any embodiment described above, optionally, the safety redundancy factor is greater than or equal to 1, and the safety redundancy factor is less than or equal to 1.3. Further, the safety redundancy factor is greater than or equal to 1.03, and the safety redundancy factor is less than or equal to 1.08.

In addition, the voltage compensation factor is greater than 0, and the voltage compensation factor is less than or equal to 1.

The present application further provides a power management system. The power management system is configured to perform a method according to any method embodiment described above.

Figure 7:
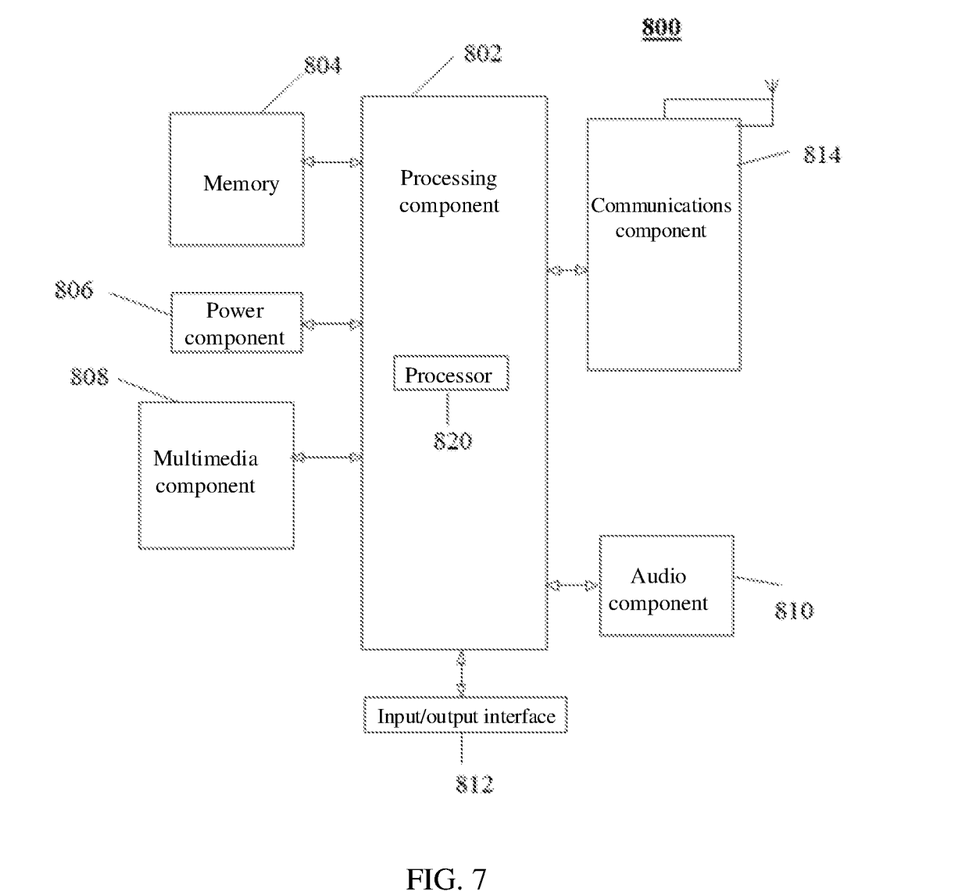
FIG. 7 is a schematic structural diagram of an electronic device according to an embodiment of the present application.

FIG. 7 is a schematic structural diagram of an electronic device according to an embodiment of the present application. As shown in FIG. 7:

The electronic device 800 may include one or more of the following components: a processing component 802, a memory 804, a power component 806, a multimedia component 808, an audio component 810, an input/output (I/O) interface 812, and a communications component 814.

The processing component 802 generally controls overall operations of the electronic device 800, such as operations related to data communication and operation recording. The processing component 802 may include one or more processors 820 to execute instructions to implement all or part of the steps of the foregoing method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store a variety of data to support operations on the electronic device 800. Examples of the data include instructions, messages, pictures, videos, and the like of any application or method to be operated on the electronic device 800. The memory 804 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 806 provides power for various components of the electronic device 800. The power component 806 may include a power management system, one or more power supplies, and other components related to generation, management, and distribution of power for the electronic device 800.

The multimedia component 808 includes a screen that provides an output interface between the electronic device 800 and a user. In some embodiments, the screen may include a liquid crystal display (LCD) and a touch panel (TP). If the screen includes a touch panel, the screen may be implemented by a touch screen to receive input signals from the user. The touch panel includes one or more touch sensors to sense a touch, a slide, and a gesture made on the touch panel. The touch sensor not only senses a boundary of a touch or slide action, but also detects a duration and a pressure related to the touch or slide operation.

The audio component 810 is configured to output and/or input an audio signal. For example, the audio component 810 includes a microphone (MIC). When the electronic device 800 is in an operating mode, such as a recording mode and a voice recognition mode, the microphone is configured to receive an external audio signal. The received audio signal may be further stored in the memory 804 or transmitted by the communications component 814. In some embodiments, the audio component 810 further includes a speaker configured to output the audio signal.

The I/O interface 812 provides an interface between the processing component 802 and a peripheral interface module. The peripheral interface module may be a keyboard, a click wheel, buttons, or the like. The buttons may include, but are not limited to: a volume button, a start button, and a lock button.

The communications component 814 is configured to facilitate wired or wireless communication between the electronic device 800 and other devices. The electronic device 800 may access a wireless network based on a communications standard, such as WiFi, 2G, or 3G, or a combination thereof. In an exemplary embodiment, the communications component 814 receives a broadcast signal or broadcast-related information from an external broadcast management system through a broadcast channel.

In an exemplary embodiment, the electronic device 800 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to implement the foregoing method.

The electronic device in this embodiment may be used to implement the technical solutions in foregoing method embodiment. The implementation principles and technical effects of the electronic device are similar to those of the method embodiment, details of which are omitted here.

The present application further provides a readable storage medium. The readable storage medium stores a computer program. When being executed, the computer program implements the method according to any of the foregoing embodiments.

A person of ordinary skill in the art understands that all or part of the method embodiment may be implemented by relevant hardware instructed by a program. The program may be stored in a computer-readable storage medium. When the program is executed, the steps in each of the foregoing method embodiments are performed. The storage medium may be any medium capable of storing program code, such as ROM, RAM, a magnetic disk, or an optical disk.

Appropriate variations and modifications may be made to the embodiments of the present application based on the foregoing principles. Therefore, the present application is not limited to the specific embodiments disclosed and described above, and the modifications and variations made to the present application still fall within the protection scope of the claims of the present application. In addition, although some specific terms are used in this specification, the terms are merely for ease of description but not intended to constitute any limitation on the present application.

What is claimed is:

1. A battery charging method, comprising:
   obtaining, by a power management system, an SOH loss of a lithium-ion battery and an initial charge cut-off voltage, wherein the lithium-ion battery comprises a negative electrode and a positive electrode with an N/P range of 0.5 to 1.1, the N/P is a ratio of a capacity per unit area of the negative electrode to a capacity per unit area of the positive electrode, the initial charge cut-off voltage is determined based on a maximum charge capacity per unit mass of a positive electrode material of the positive electrode, a differential voltage vs. capacity curve of the positive electrode material, a safety redundancy factor, a lower-limit cut-off voltage applied to the lithium-ion battery, and the N/P;
   determining, by the power management system, a charge cut-off voltage of a next charge process of the lithium-ion battery based on the SOH loss, the initial charge cut-off voltage of the lithium-ion battery, and a voltage correction factor, wherein the initial charge cut-off voltage is determined based on the N/P, and the charge cut-off voltage increases with increase of a count of charging; and
   performing, by the power management system, the next charge process to charge the lithium-ion battery until the charge cut-off voltage is reached.

2. The method according to claim 1, wherein the N/P range is 0.8 to 1.0.

3. The method according to claim 1, wherein the charge cut-off voltage of the next charge process is determined based on the following formula:

$$U = U_0 + \varepsilon \times \Delta SOH$$

wherein, U represents the charge cut-off voltage of the next charge process, $U_0$ represents the initial charge cut-off voltage, $\Delta SOH$ represents the SOH loss, and $\varepsilon$ represents the voltage correction factor.

4. The method according to claim 1,
   wherein the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

5. The method according to claim 4, wherein the initial charge cut-off voltage is determined based on the following formula:

$$U_0 = \int_0^{\frac{C_0 \times (N/P)}{a}} \frac{dU}{dQ} \times dQ + U_{low}$$

wherein, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

6. The method according to claim 4, wherein the voltage correction factor is determined based on the following formula:

$$\varepsilon = b \times \frac{dU}{C_0 \times dQ} \times ICE$$

wherein, $\varepsilon$ represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

7. The method according to claim 4, wherein the safety redundancy factor is greater than or equal to 1, and the safety redundancy factor is less than or equal to 1.3.

8. A battery charging device, comprising:
an obtaining module, configured to obtain an SOH loss of a lithium-ion battery and an initial charge cut-off voltage, wherein the lithium-ion battery comprises a negative electrode and a positive electrode with an N/P range of 0.5 to 1.1, the N/P is a ratio of a capacity per unit area of the negative electrode to a capacity per unit area of the positive electrode, the initial charge cut-off voltage is determined based on a maximum charge capacity per unit mass of a positive electrode material of the positive electrode, a differential voltage vs. capacity curve of the positive electrode material, a safety redundancy factor, a lower-limit cut-off voltage applied to the lithium-ion battery, and the N/P; and a processing module, configured to:
determine a charge cut-off voltage of a next charge process of the lithium-ion battery based on the SOH loss, the initial charge cut-off voltage of the lithium-ion battery, and a voltage correction factor, wherein the initial charge cut-off voltage is determined based on the N/P, and the charge cut-off voltage increases with increase of a count of charging; and
perform the next charge process to charge the lithium-ion battery until the charge cut-off voltage is reached.

9. The battery charging device according to claim 8, wherein the N/P range of the lithium-ion battery is 0.8 to 1.0.

10. The battery charging device according to claim 8, wherein the charge cut-off voltage of the next charge process is determined based on the following formula:

$$U = U_0 + \varepsilon \times \Delta SOH$$

wherein, U represents the charge cut-off voltage of the next charge process, $U_0$ represents the initial charge cut-off voltage, $\Delta SOH$ represents the SOH loss, and $\varepsilon$ represents the voltage correction factor.

11. The battery charging device according to claim 8, wherein the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

12. The battery charging device according to claim 11, wherein the initial charge cut-off voltage is determined based on the following formula:

$$U_0 = \int_0^{\frac{C_0 \times (N/P)}{a}} \frac{dU}{dQ} \times dQ + U_{low}$$

wherein, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

13. The battery charging device according to claim 12, wherein the voltage correction factor is determined based on the following formula:

$$\varepsilon = b \times \frac{dU}{C_0 \times dQ} \times ICE$$

wherein, $\varepsilon$ represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

14. The battery charging device according to claim 8, wherein the safety redundancy factor is greater than or equal to 1, and the safety redundancy factor is less than or equal to 1.3.

15. An electronic device, comprising:
a processing component; and
a non-volatile computer-readable storage medium storing a computer program that, when executed on the processing component, causes the electronic device to:
obtain an SOH loss of the lithium-ion battery and an initial charge cut-off voltage, wherein lithium-ion battery comprises a negative electrode and a positive electrode with an N/P range of 0.5 to 1.1, the N/P is a ratio of a capacity per unit area of the negative electrode to a capacity per unit area of the positive electrode, the initial charge cut-off voltage is determined based on a maximum charge capacity per unit mass of a positive electrode material of the positive electrode, a differential voltage vs. capacity curve of the positive electrode material, a safety redundancy factor, a lower-limit cut-off voltage applied to the lithium-ion battery, and the N/P;
determine a charge cut-off voltage of a next charge process of the lithium-ion battery based on the SOH loss, the initial charge cut-off voltage of the lithium-ion battery, and a voltage correction factor, wherein the initial charge cut-off voltage is determined based on the N/P, and the charge cut-off voltage increases with increase of a count of charging; and
perform the next charge process to charge the lithium-ion battery until the charge cut-off voltage is reached.

16. The electronic device according to claim 15, wherein the N/P range is 0.8 to 1.0.

17. The electronic device according to claim 15, wherein the charge cut-off voltage of the next charge process is determined based on the following formula:

$$U = U_0 + \varepsilon \times \Delta SOH$$

wherein, U represents the charge cut-off voltage of the next charge process, $U_0$ represents the initial charge cut-off voltage, $\Delta SOH$ represents the SOH loss, and $\varepsilon$ represents the voltage correction factor.

18. The electronic device according to claim 15, wherein the voltage correction factor is determined based on the maximum charge capacity per unit mass of the positive electrode material of the lithium-ion battery, the differential voltage vs. capacity curve of the positive electrode material, a voltage compensation factor, and an initial coulombic efficiency of the lithium-ion battery.

19. The electronic device according to claim 17, wherein the initial charge cut-off voltage is determined based on the following formula:

$$U_0 = \int_0^{\frac{C_0 \times (N/P)}{a}} \frac{dU}{dQ} \times dQ + U_{low}$$

wherein, $U_0$ represents the initial charge cut-off voltage, $C_0$ represents the maximum charge capacity per unit mass of the positive electrode material of the lithium-ion battery, $$\frac{dU}{dQ}$$

represents the differential voltage vs. capacity curve of the positive electrode material, a represents the safety redundancy factor, and $U_{low}$ represents the lower-limit cut-off voltage applied to the lithium-ion battery.

20. The electronic device according to claim 15, wherein the voltage correction factor is determined based on the following formula:

$$\varepsilon = b \times \frac{dU}{C_0 \times dQ} \times ICE$$

wherein, $\varepsilon$ represents the voltage correction factor, $C_0$ represents the maximum charge capacity per unit mass of the positive electrode material of the lithium-ion battery, $$\frac{dU}{dQ}$$

represents the differential voltage vs. capacity curve of the positive electrode material, b represents the voltage compensation factor, and ICE represents the initial coulombic efficiency of the lithium-ion battery.

21. The electronic device according to claim 15, wherein the safety redundancy factor is greater than or equal to 1, and the safety redundancy factor is less than or equal to 1.3.

* * * * *